INVENTORS
RICHARD M. CRANDELL
JESS H. HOFFMAN
By George C. Sullivan
Agent

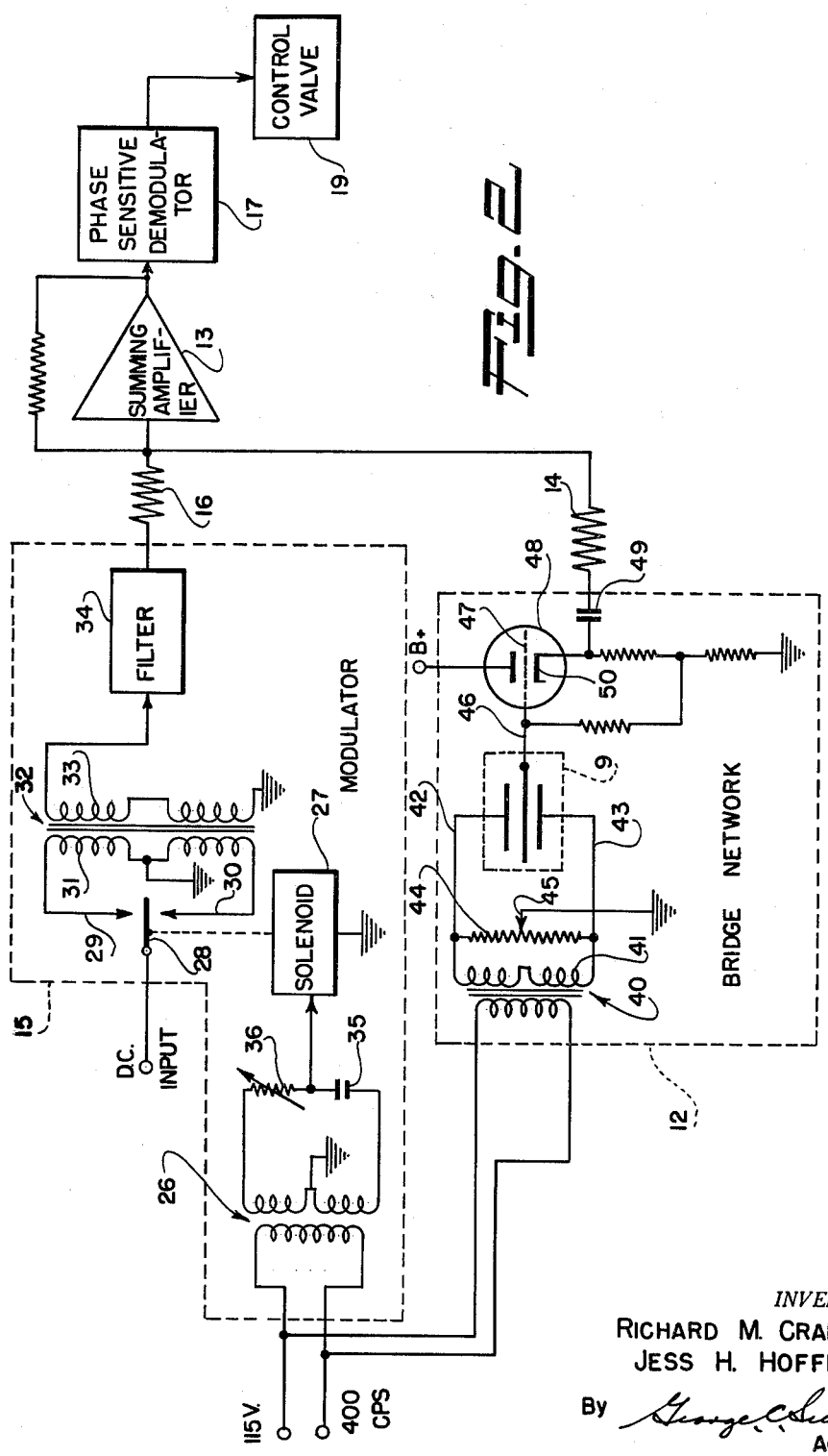

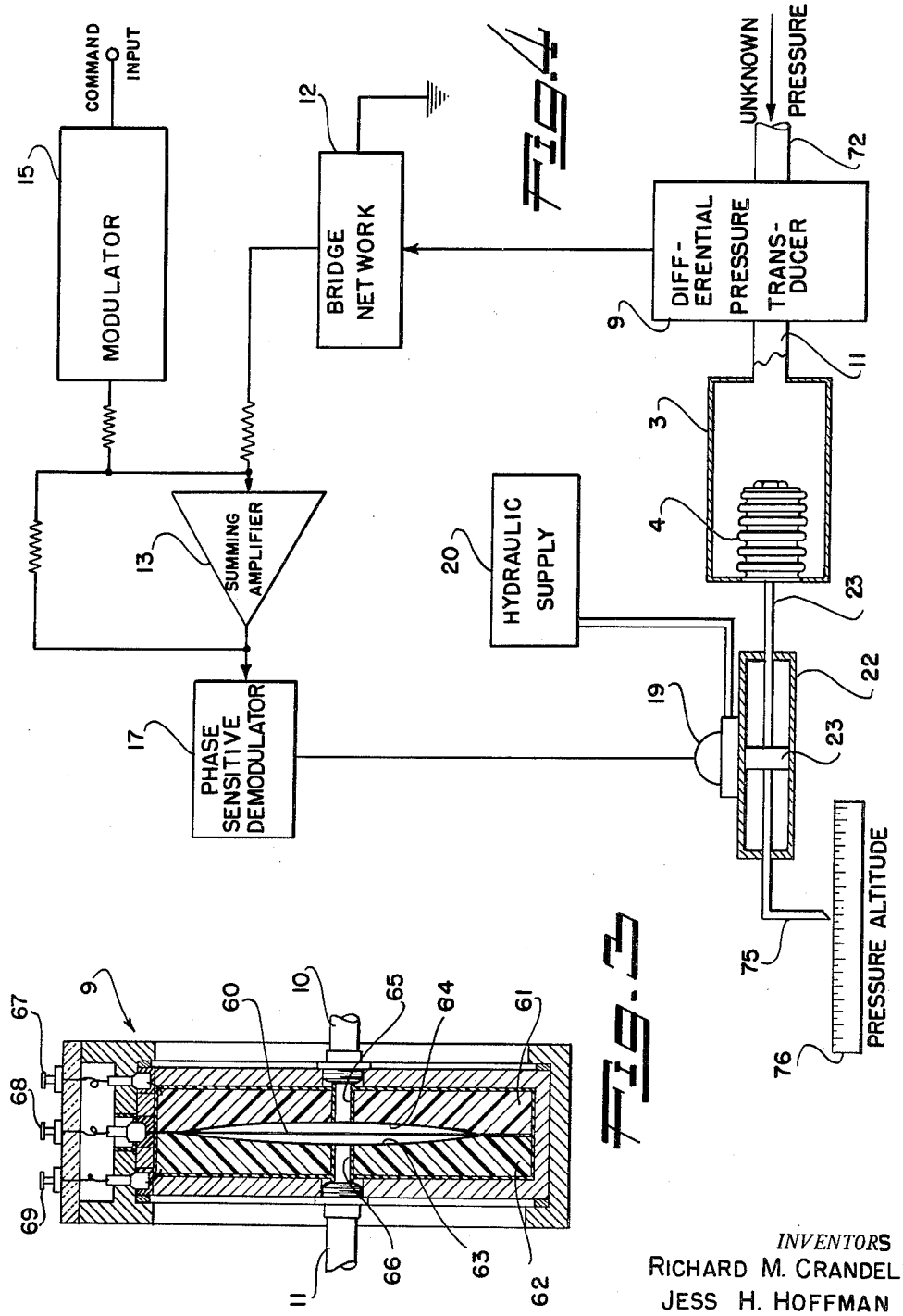

United States Patent Office 3,045,470
Patented July 24, 1962

3,045,470
PRESSURE CONTROLLER
Richard M. Crandell, Van Nuys, and Jess H. Hoffman, North Hollywood, Calif., assignors to Lockheed Aircraft Corporation, Burbank, Calif.
Filed Jan. 8, 1957, Ser. No. 633,142
4 Claims. (Cl. 73—4)

This invention concerns a pressure controller for accurately measuring pressures and for the static and dynamic performance testing of pressure sensitive equipment such as altimeters and airspeed indicators.

Briefly, the pressure controller device employs a variable volume working chamber filled with a compressible fluid such as air and a secondary pressure source of compressible fluid in combination with a differential pressure transducer and a servo-loop drive system which maintains a prescribed relationship between the fluid pressure in the working chamber and the fluid pressure of the secondary source by controlling the working chamber volume.

In one form of the invention the secondary source of fluid pressure is provided by a reference chamber containing a compressible fluid at a predetermined pressure whereby an external signal applied to the servo-loop accurately varies the working chamber fluid pressure to simulate pressure changes occurring as a function of altitude or velocity for testing the static and dynamic performance of pressure sensitive equipment such as altimeters and air speed indicators.

In another form of the invention atmospheric air pressure is supplied as the secondary source of fluid pressure to vary the working chamber fluid pressure in accordance with changes in the atmospheric air pressure. This configuration may be employed directly as a pressure sensitive device for accurately measuring altitude, air speed, or the like.

Conventionally, pressure sensitive measuring equipment such as altimeters, air speed indicators, and the like, are performance checked only statically using manometer type devices. Since pressure sensitive measuring equipment in general operates dynamically, a check of performance using test equipment of the static type is unrealistic and in many cases unreliable. An altimeter, for example, may appear to be functioning properly when fixed pressures are applied thereto and yet produce material errors in its output when a continually varying pressure is applied thereto as in actual use. The ability to check the performance of the device dynamically as it is required to function in actual practice is therefore most desirable. Accordingly, it is a primary object of this invention to provide a device having the required accuracy for dynamically testing pressure sensitive equipment.

It is another object of this invention to provide a pressure controller for accurately indicating the magnitude of an unknown pressure for determining altitude, velocity, or the like. By driving with an integrating servo-loop through a direct comparison of pressures, errors resulting from mechanical and electrical tolerances as well as hysteresis or other static errors in the servo-drive system are substantially eliminated. As a result the pressure controller may be used either as a pressure measuring device or as a test instrument of very high accuracy.

Another object of this invention is to provide a pressure controller which may be regulated either by a secondary pressure source or a control voltage for accurately measuring pressures or for checking pressure sensitive devices to determine errors of a dynamic nature resulting from time lags, etc. in the devices.

Another object of this invention is to provide a pressure controller which is accurate and dependable in operation and suitable for use under rugged environmental conditions such as those encountered on aircraft.

Still another object of this invention is to provide a pressure controller which is relatively simple and dependable in operation and which is well suited for use with automatic programming devices such as computers, and the like, having an electrical voltage as the output for establishing a dynamic pressure variation.

Further and other objects will become apparent from a reading of the following detailed description, especially when considered in combination with the accompanying drawing wherein like numerals refer to like parts.

In the drawing:

FIGURE 2 is a detailed schematic of the feed-back circuitry employed in the FIGURE 1 device;

FIGURE 3 is a sectional view of a differential pressure transducer suitable for use in the FIGURE 1 device; and FIGURE 4 is a schematic block diagram of the pressure controller in a configuration suitable for use as a pressure measuring instrument for determining altitude, air speed, or the like.

Figure 1:
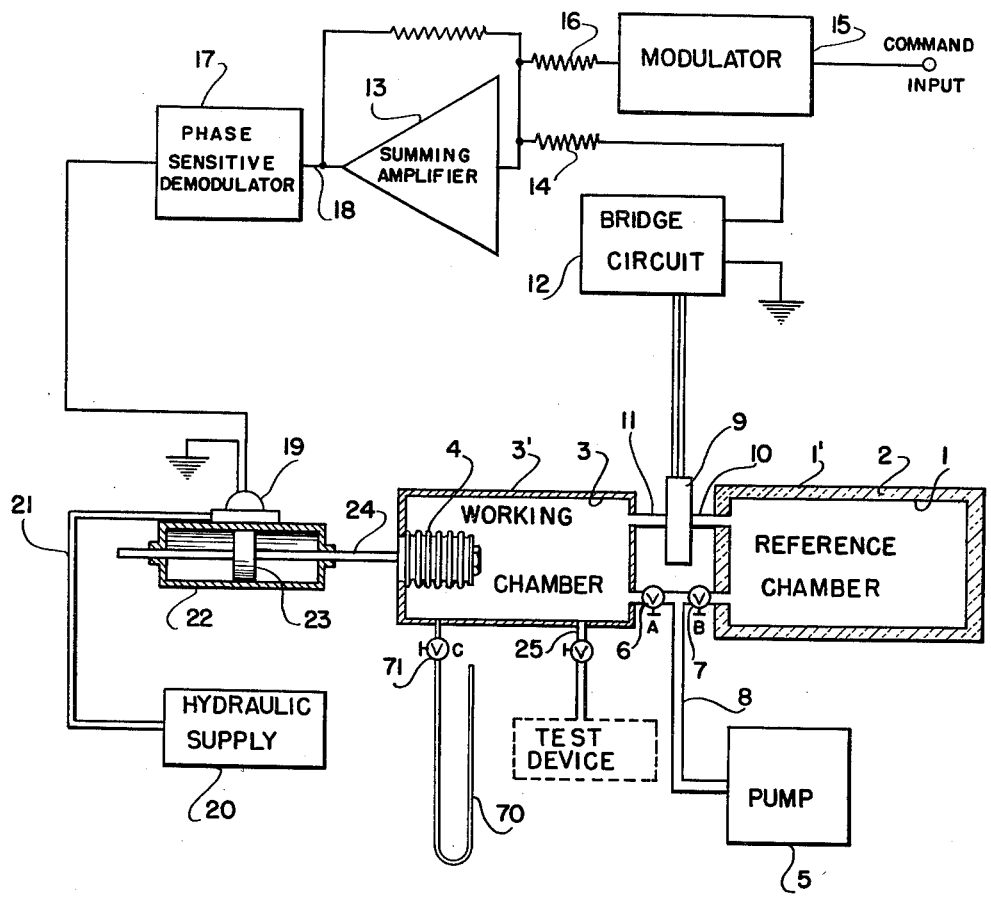
FIGURE 1 is a schematic block diagram showing one form of the pressure controller for testing pressure sensitive equipment.

In the FIGURE 1 configuration, the pressure controller has as a secondary pressure source, the compressible fluid stored within a reference chamber 1 formed by a container 1'. The reference chamber may be thermally insulated by a blanket 2 to minimize changes in pressure due to changes in the ambient temperature. A fluid filled working chamber 3 formed by a container 3' is also provided wherein the working chamber container has a flexible diaphragm or bellows 4 formed in one end thereof for varying the working chamber volume. Means are provided such as a pump 5 which communicates with working chamber 3 and reference chamber 1 through line 8 for establishing a predetermined initial pressure in each chamber preparatory to running a test. Valves 6 and 7 are provided in line 8 connecting the pump with the working and reference chambers so that the fluid pressure in each chamber may be established independently of the fluid pressure in the other chamber and so that fluid communication between the chambers and the pump may be cut off during operation of the device.

A differential pressure transducer 9 is coupled to reference chamber 1 through line 10 and to working chamber 3 through line 11 for having the pressure within each chamber applied thereto. The differential pressure transducer, one preferred form of which is shown in FIGURE 3, forms a part of a bridge circuit 12 to provide an output, the phase of which indicates whether the fluid pressure in the working chamber is greater or less than the fluid pressure in the reference chamber and the amplitude of which indicates the magnitude of the pressure difference. This output from the bridge circuit is applied to a differential or summing amplifier 13 through a summing resistor 14.

A second input to summing amplifier 13 is supplied by a modulator 15 through a summing resistor 16. Modulator 15 receives a direct current command signal. The command signal may be derived from a fixed source of potential or a variable source of potential such as that obtained from a computer or other programming device set up to provide a desired dynamic pressure variation. The modulator converts the direct current input into an alternating current signal of the same frequency as the signal from the bridge circuit but of opposite phase. The amplitude of the modulator output signal is proportional to the magnitude of the direct current command signal applied to the modulator and is used to control the pressure controller device by algebraically adding with the bridge circuit output in the summing amplifier. The resulting error signal from the summing amplifier representing the difference between the modulator and bridge circuit outputs is applied to a phase sensitive demodulator 17 through lead 18 for actuating a control valve 19.

A hydraulic fluid reservoir 20 connects with control valve 19 through line 21 for supplying fluid to an actuating cylinder 22. A signal at control valve 19 of one polarity effects fluid flow from the hydraulic fluid reservoir into the hydraulic cylinder on one side of piston 23 and a signal of the opposite polarity at control valve 19 effects fluid flow into the cylinder on the other side of the piston. Axial movement of piston 23 is thereby brought about and since piston 23 is connected with bellows 4 in the working chamber through a piston rod 24, a feedback loop is completed for controlling the fluid pressure in the working chamber. While a hydraulic actuating cylinder is shown, it should be understood that other types of actuators such as those of the electrical type may serve the same purpose without departing from the teachings of this invention.

A pressure sensitive device to be tested may be coupled to the outlet 25 on the working chamber for receiving the compressible fluid at the pressure established by the direct current input command signal to modulator 15.

The proper phasing of the modulator and bridge circuit signals is obtained as most clearly shown in FIGURE 2 wherein the driving voltage for both components is obtained at a common source such as the 115 volt 400 cycle per second source indicated. The driving voltage is applied to a stepdown transformer 26 forming a part of modulator 15 for actuating a solenoid 27 mechanically coupled to a switch 28 serving as a chopper for the direct current input command signal. Switch arm 28 alternately connects the direct current input command signal with lead 29 and lead 30 on the primary winding 31 of a transformer 32. When the driving voltage at solenoid 27 is positive, for example, switch arm 28 is in contact with lead 29 and when the driving voltage is negative switch arm 28 is in contact with lead 30. The actuation of switch arm 28 is therefore controlled by the frequency of the driving voltage, converting the direct current input command signal to an alternating current modulator output command signal at the same frequency as the driving voltage. The alternating current modulator command signal is obtained at the secondary coil 33 of output transformer 32 and applied to a filter 34 which is adapted to pass the 400 cycle per second signal and the desired side bands and suppress the harmonics.

A 180° phase shift in the alternating current modulator output command signal with respect to the driving voltage is obtained by center tapping the secondary of stepdown transformer 26 to ground. Additional control over the phase shift in the modulator is provided by capacitor 35 and variable resistor 36 connected in series with respect to transformer 26 and in parallel with respect to solenoid 27. By properly adjusting resistor 36, small phase shift errors inherent in the chopper and modulator circuit may be cancelled out to accurately obtain the 180° phase shift desired for the modulator output. The modulator output obtained from filter 34 is applied to summing amplifier 13, as previously described, through summing resistor 16.

The bridge circuit receives the same driving voltage which operates stepdown transformer 26 in modulator 15. The driving voltage is applied to a transformer 40, the secondary winding 41 of which is connected to differential pressure transducer 9 through leads 42 and 43 forming a bridge. A bridge balancing potentiometer 44 is connected across secondary coil 41 with the wiper arm 45 connecting with ground. The bridge output is obtained at lead 46 at the differential pressure transducer and is applied to the grid 47 of a cathode follower 48 for matching the output impedance of the bridge circuit with the input impedance of summing amplifier 13. A direct current blocking capacitor 49 is employed to couple cathode 50 of the cathode follower with summing resistor 14. When the pressure differential is zero, the bridge is balanced but when a pressure differential exists the bridge is unbalanced by a capacity change in the transducer to provide an output in phase with the driving voltage or out of phase with the driving voltage, depending upon whether the working chamber pressure is greater or less than the pressure in the reference chamber.

When the algebraic addition of the alternating current modulator output command signal and the bridge network output signal is other than zero, an error signal results at the output of summing amplifier 13 for actuating control valve 19 and driving piston 23 in a direction depending upon the phase of the error signal.

A capacity type differential pressure transducer suitable for use in the FIGURE 2 bridge circuitry is shown in FIGURE 3 wherein a stretched metal diaphragm 60 is held between two insulating electrodes 61 and 62 that serve to support the diaphragm and provide an overpressure stop. The inner surfaces 63 and 64 of the insulating electrodes are concave, forming a cavity permitting limited movement of the metal diaphragm 60 towards one or the other of the electrodes for changing the capacitance between the diaphragm and the electrodes. Openings 65 and 66 extend through electrodes 61 and 62 for applying fluid pressure to diaphragm 60. Opening 65, for example, may be coupled to the secondary source of fluid pressure, identified as reference chamber 1, through line 10 and opening 66 may be coupled to the working chamber 3 through line 11, as shown in FIGURE 1. Terminals 67, 68 and 69 connect the electrodes and diaphragm of the transducer with leads 42, 46 and 43, respectively, in the bridge circuit of FIGURE 2. While a differential pressure transducer of the capacity type is preferred, it should be understood that any differential pressure transducer may be employed without departing from the more basic teachings of this invention.

In the FIGURE 1 configuration of the pressure controller a static pressure level of the desired magnitude is first established in the reference and working chambers 1 and 3 by pump 5. Then valves 6 and 7 are closed. With the pressure sensitive device to be tested coupled to the working chamber through output line 25, a direct current input command signal is applied to modulator 15. The error signal resulting from the algebraic addition of the alternating current modulator output command signal and the bridge circuit output signal is obtained in the summing amplifier to control the movement of piston 23 in hydraulic cylinder 22 through control valve 19. Movement of piston 23 causes a change in the volume in working chamber 3 such that the fluid pressure therein will equalize the transducer bridge network signal and the modulator output signal. Variations in the direct current command signal therefore results in producing corresponding variations in the fluid pressure of the working chamber.

To aid in establishing the desired static pressure level in working chamber 3 or in reference chamber 1, or both, a manometer 70 may be connected to the chamber through a suitable control valve 71. As the pressure controller is set up for performing a test, valve 71 is opened, allowing the manometer to indicate the static pressure inside the chamber as obtained through the operation of pump 5. When the desired static pressure level is obtained, valve 71 is closed and pump 5 is shut down. Since the differential pressure transducer has a limited working range, the static pressure level established in the working and reference chambers should be as close to the pressure range required for testing the particular pressure sensitive device as possible. Where the controller is to check the performance of a pressure sensitive device over a dynamic range greater than that permitted by the transducer it is necessary to establish several different static pressure levels in the reference and working chambers and repeat the test procedure for each level.

A modification of the FIGURE 1 device is illustrated in FIGURE 4 wherein the reference chamber is eliminated, opening one side 72 of differential pressure transducer 9 to an unknown pressure to be measured such as atmospheric air pressure. The servo-loop including summing amplifier 13, power amplifier 17, control valve 19, actuating cylinder 22 and bellows 4 in working chamber 3 may be the same as that described for the FIGURE 1 configuration. The differential pressure transducer and bridge circuit serves as the follow-up signal source while the input signal to modulator 15 provides a command reference signal at the modulation output. The ratio between the working chamber pressure and the pressure of the secondary source is established by the command signal, the same as with the FIGURE 1 device.

The FIGURE 4 device may be used to measure pressure altitude, for example, by establishing an alternating current command signal level at the modulator output which will maintain fluid pressure in the working chamber at 14.7 p.s.i. (standard sea level pressure) when the open side of the differential pressure transducer is subjected to standard sea level pressure. When so calibrated the pressure within working chamber 3 will be maintained equal to the unknown pressure by the servo-loop and the position of piston 23 relative to its position under standard air pressure conditions will represent the magnitude of the unknown pressure. Pressure altitude may be obtained as shown diagrammatically in FIGURE 4 by connecting an indicator 75 to piston rod 23 and calibrating a dial 76 associated with the indicator in terms of pressure altitude.

The FIGURE 4 configuration of the pressure simulator is useful in a wide variety of applications where pressure measurements are to be made. Since the follow-up signal from the transducer bridge circuit is a function only of the differential pressure across the transducer and since the servo drive system serves as an integrator for the error signals, sources of error such as hysteresis in bellows 4 are automatically eliminated. As a result, the device is capable of measuring pressures accurately and with high sensitivity.

It should be understood that certain alterations, modifications and substitutions may be made to the instant disclosure without departing from the spirit and scope of the invention as defined by the appended claims.

We claim:

1. A pressure controller comprising, means forming a variable volume working chamber, said chamber having a compressible fluid stored therein, a secondary compressible fluid pressure source, a capacity type differential pressure transducer connecting with said working chamber and being responsive to the working chamber fluid pressure and to the secondary source of fluid pressure to establish a capacitance proportional to the difference between the fluid pressures, a bridge network including said transducer, a source of alternating current connecting with said bridge network to provide an alternating current output signal from said bridge network which is controlled by the capacitance of said transducer whereby the amplitude of the output signal represents the magnitude of the pressure difference, a command signal, a modulator responsive to said command signal and to said source of alternating current and providing an alternating current output signal the amplitude of which is proportional to the amplitude of the command signal and the phase of which is shifted substantially 180° with respect to the phase of the source of alternating current, a summing amplifier responsive to the output signals from both said bridge network and said modulator and providing an error signal representing the algebraic sum of the bridge network and modulator output signals, and servo-drive means engaging said working chamber and varying the volume thereof in response to said error signal for maintaining the ratio between the fluid pressure in the working chamber and the secondary source dependent upon the command signal.

2. A pressure controller comprising, means forming a variable volume working chamber, said chamber having a compressible fluid stored therein, a secondary source of fluid pressure, a flexible, fluid sealing diaphragm interposed between said working chamber and said secondary source of fluid pressure and subjected on one side to the fluid pressure in the working chamber and on the opposite side to the fluid pressure of the secondary source, means detecting deflection of said diaphragm due to the difference in fluid pressure applied thereto and providing an alternating current output signal wherein the amplitude represents the magnitude of the pressure difference, an externally applied command signal, modulator means responsive to said externally applied command signal and providing an alternating current output signal the amplitude of which is proportional to the amplitude of the externally applied command signal, differential means responsive to the output signals from the detecting means and said modulator means and providing an error signal representing the algebraic sum of the detecting means output and the modulator means output, and servo-drive means engaging said working chamber and varying the volume thereof in response to said error signal for maintaining the ratio between the fluid pressure in said working chamber and the fluid pressure of the secondary source dependent upon the command signal.

3. A pressure controller comprising, means forming a variable volume working chamber, means forming a fixed volume reference chamber, said chambers having a compressible fluid stored therein, a flexible, fluid sealing diaphragm interposed between said chambers and subjected on one side to the fluid pressure in the working chamber and on the opposite side to the fluid pressure in the reference chamber, circuit means detecting deflection of said diaphragm due to the difference in the fluid pressures applied thereto and providing an alternating current output signal wherein the amplitude represents the magnitude of the pressure difference of the fluid in the one chamber with respect to the fluid in the other chamber, an externally applied command signal, modulator means responsive to said externally applied command signal and providing an alternating current output signal the amplitude of which is proportional to the amplitude of the externally applied command signal, differential means responsive to the output signals from both said circuit means and said modulator means and providing an error signal representing the algebraic sum of the circuit means output and the modulator means output, and servo-drive means engaging said working chamber and varying the volume thereof in response to said error signal for maintaining the ratio between the fluid pressure in said working chamber and the fluid pressure in said reference chamber dependent upon the command signal.

4. A pressure controller comprising, means forming a variable volume working chamber, said chamber having a compressible fluid stored therein, a secondary source of fluid pressure, a flexible fluid sealing diaphragm interposed between said working chamber and said secondary source of fluid pressure and subjected on one side to the fluid pressure in the working chamber and on the opposite side to the fluid pressure of the secondary source, means detecting deflection of said diaphragm due to the difference in the fluid pressures applied thereto and providing an electrical output signal wherein the amplitude represents the magnitude of the pressure difference, an externally applied electrical command signal, differential means responsive to the electrical output signal and the electrical command signal and providing an error signal representing the difference in magnitude of the electrical output signal and the electrical command signal, and servo-drive means engaging said working chamber and varying the volume thereof in response to said error signal for maintaining the ratio between the fluid pressure in said working chamber and the fluid pressure of the secondary source dependent upon the electrical command signal.

References Cited in the file of this patent

UNITED STATES PATENTS

| | | |
|---|---|---|
| 2,422,702 | Rodanet | June 24, 1947 |
| 2,446,740 | Burns | Aug. 10, 1948 |
| 2,617,304 | Conover | Nov. 11, 1952 |
| 2,678,178 | MacCallum | May 11, 1954 |
| 2,692,546 | Fischer et al. | Oct. 26, 1954 |
| 2,713,266 | Smith et al. | July 19, 1955 |
| 2,762,938 | Newbold | Sept. 11, 1956 |
| 2,788,664 | Coulbourn et al. | Apr. 16, 1957 |

OTHER REFERENCES

Publication Instruments, October 1953, pages 1626, 1527, 1552, 1553, "Automatic Calibration of Transducers" by Kinkel et al.